Aug. 7, 1951  A. GERMAIX  2,563,405

HEIGHT PILOTING SYSTEM

Filed Sept. 19, 1947

INVENTOR
ANDRE GERMAIX
By his ATTY.

UNITED STATES PATENT OFFICE 2,563,405

HEIGHT PILOTING SYSTEM

André Germaix, Meudon, France, assignor to Compagnie pour la Fabrication des Compteurs et Materiel D'Usines a Gaz, Montrouge, France Application September 19, 1947, Serial No. 774,976
In France September 26, 1946

10 Claims. (Cl. 343—112)

The present invention is concerned with devices for controlling the piloting in height of moving conveyances, that make use of a cathode-ray oscillograph tube and it is related to improvements permitting to control the altitude of these conveyances.

It is known to represent before the pilot of an aircraft the indications corresponding to the position of his machine by means of a repeater instrument constituted by a cathode-ray oscillograph tube.

In such a device, assume that the angular deviations of the aircraft are measured with respect to a datum trihedron, which is centred on the centre of gravity of the aircraft and keeps a fixed direction in space; these deviations are commonly detected by apparatuses that measure the departures or differences in heading, longitudinal and lateral inclination. In a device used in the invention, the heading departure results in the displacing, on the screen of the oscilloscope, of a vertical scanning trace to the right or to the left, under the action of a positive or negative voltage applied across the suitable deflecting plates of a cathode-ray tube functioning with electrostatic deflection. The deviation or departure in lateral inclination is obtained by a rotation in one or the other direction of a scanning trace which is horizontal when the aircraft is horizontal. The rotation and production of this trace are obtained by applying alternating voltages of suitable phase and magnitude produced by the instrument detecting the lateral inclination. The departure or difference in longitudinal inclination is figured by the general displacement in the vertical direction of the above-mentioned trace having a mean horizontal position, caused by applying a direct voltage across the appropriate deflection plates of the cathode-ray tube. The observation of either trace is obtained through the manipulation of a suitable switch. The pilot flies his aircraft by using this instrument, maintaining the vertical trace at the centre of the screen and the other trace in a horizontal position passing through the centre of the screen. To this end, he applies the same method as in the case when he has a gyroscopic horizon and a heading indicator of conventional type at his disposal.

The present invention is concerned with a device allowing for the execution of more complete controlling manipulations particularly adapted to the modern methods of aerial navigation, through the observation on the repeater oscilloscope of a formation identical to that above-described, the same pilot's reflexes being appealed to.

The principle of the present invention is to apply to the deflection plates of the cathode-ray oscillograph tube an additional voltage, the direction and magnitude of which are determined by the difference between the altitude of the aircraft and another predetermined altitude. The horizontal trace of the oscillograph will therefore shift upward or downward, so that when the pilot brings back this trace to the centre of the dial, he will give the aircraft a longitudinal inclination that will permit the aircraft of attaining the predetermined altitude.

The value of this additional voltage remains under certain limits in order that the angles to be given to the control members of the moving machine be within normal value for the piloting.

The device according to the invention comprises an ordinary flight indicator-oscilloscope combined with an altimeter including an electric member, such as a potentiometer, across the terminals of which a direct voltage is to be found; such voltage goes through zero when the altimeter reads a predetermined altitude and its positive or negative value varies at first linearly with the difference in altitude and its sign, and afterwards assumes a constant, positive or negative value when the difference exceeds a predetermined absolute value. This voltage is applied across the vertical deflection plates of the oscilloscope with such a polarity that the displacement of the oscillogram which ensues induces the pilot to a manoeuvring operation with the result that the aircraft tends to come back to the predetermined altitude.

According to a modification of the above device, the altimeter used is a radio-altimeter and the predetermined altitude is that of the running track for the landing. The voltage given by the radio-altimeter is superimposed on such a fixed deviation voltage that the position of the elevator, figured by the oscillogram for this fixed voltage alone, corresponds to the angle of landing of the aircraft for the purpose of executing a blind landing.

The device which is the object of the invention is explained in the following description in connection with the accompanying drawings in which.

Figure 1:
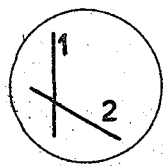
Fig. 1 shows the outside appearance of the screen of an oscilloscope on which is obtained an oscillogram corresponding to an aircraft with the tail down, laterally inclined to the left and heading on the right of the direction to be maintained.

Referring to Figure 1, the trace 1 is controlled by the departure in heading that results in a direct voltage applied across vertical plates of the oscilloscope in the position of the switching device, corresponding to the vertical scanning that permits the formation of this trace.

The trace 2 is obtained in the other position of the switching device through a known method which consists namely in combining the action of two alternating potentials, the proportion of which is regulated by the detector of lateral inclination departure. Its position as regards height is controlled by a direct voltage from the indicator of height difference, applied across horizontal plates of the oscilloscope.

Figure 2:
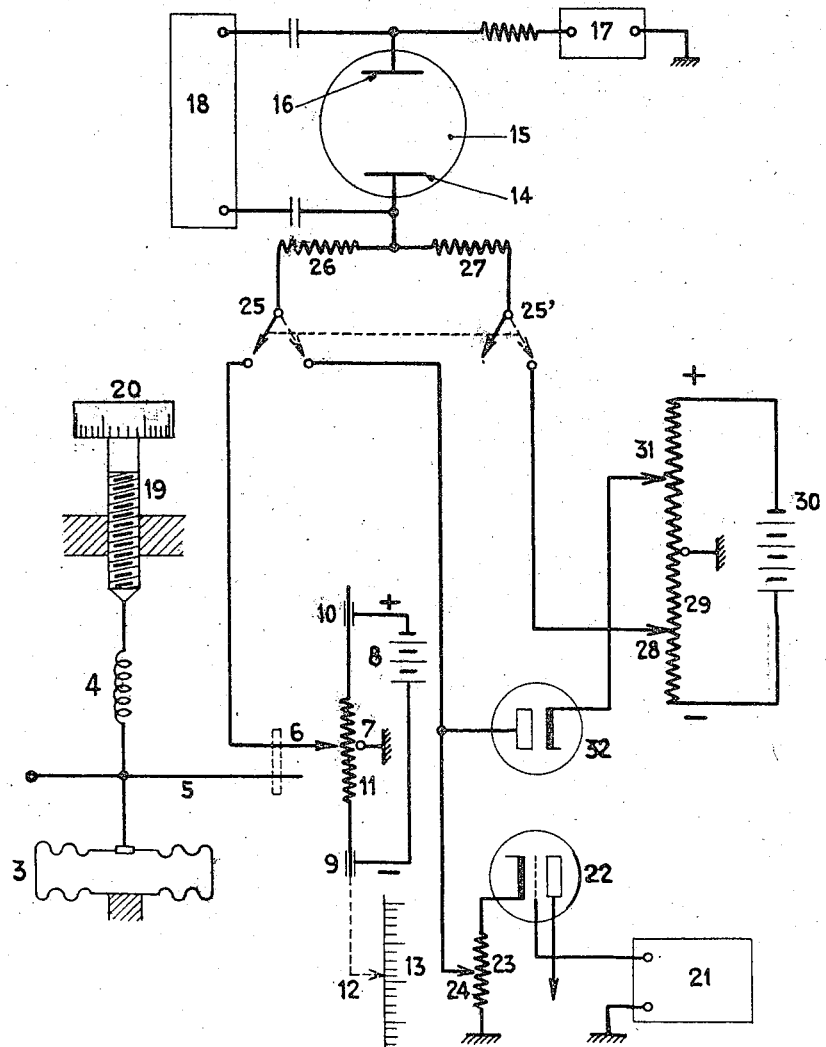
Fig. 2 represents diagrammatically a device according to the invention and its connection to a deflecting plate of the oscilloscope, so as to permit a pilot to keep to or attain a predetermined altitude. A variant is shown in the same figure, allowing the pilot to execute a blind landing.

Figure 2 shows the device according to the invention, given by way of example. In combination with the above-mentioned means for controlling the trace 2, it comprises a unit controlling an additional displacement of this trace as a function of the difference between the altitude of the aircraft and another predetermined altitude. According to Figure 2, this unit comprises an altimetric box or pneumometric barometer of the aneroid type 3, evacuated and balanced by a spring 4. The needle 5 follows the motions of the wall of the box as a function of pressure, and consequently of altitude. Needle 5 is shown as directly connected to the box, but it is obvious that some sort of step-up system may be introduced. This needle is integral with the cursor 6 of a potentiometer 7 having its mid-point grounded. This potentiometer is supplied with direct current by any suitable source 8 connected for instance through two sliding contacts 9 and 10. The resistance part 11 of the potentiometer can be moved as a whole and its position is marked by an index 12 before a scale 13 calibrated in altitudes. The cursor 6 is connected to the plate 14 of an oscilloscope 15. The opposite plate 16 of the oscilloscope is connected to the detector 17 of longitudinal inclination variations. On the drawing there has been represented the connection of the plates 14 and 16 to the detector 18 of lateral inclination.

The apparatus is so devised and adjusted that for a given position of the index 12, the cursor 6 is actually opposite the mid-point of potentiometer 7 when pressure on box 3 corresponds to the altitude read on scale 13. If this altitude varies, the cursor 6 follows the displacements of needle 5 and moves on the potentiometer 7, applying thereby to plate 14 a negative or positive potential which is a function of the difference in altitude. When this difference attains such a value that the cursor 6 leaves the resistant part of the potentiometer, the potential on plate 14 cannot exceed the voltage across the terminals of the potentiometer and it follows therefrom that the angle of the dive or rear indicated by the horizontal trace of the oscilloscope cannot exceed a pre-set value. Instead of actuating the potentiometer 7, one might also vary the datum altitude by modifying the tension of spring 4, for instance by means of the screw 19 having a drum 20 which is then calibrated in altitudes.

In the event of low altitude flying, it is of advantage to replace the box-type altimeter by a radio-altimeter that will be used during the landing. A radio-altimeter 21 is generally terminated by an electronic tube 22, laid out in the form of a cathode follower and having a cathode resistor traversed by a current proportional to altitude. In a device according to the invention, this cathode resistor is constituted by a potentiometer 23, the cursor 24 of which is connected through the intermediary of the moving contact 25 of the double-pole change-over switch 25—25' to the plate 14 of the oscilloscope. The said switch 25—25' permits of passing from operation with the box-type altimeter to operation with the radio-altimeter. Thus, it appears that plate 14 is connected to the cursor 24 by way of the resistor 26 and the section 25 of the change-over switch 25—25'. This plate 14 is also connected by way of the resistor 27 and the switch section 25' to the cursor 28 of a potentiometer 29 having its central point grounded, which potentiometer is supplied with direct current by any appropriate source 30. Another cursor 31 of potentiometer 29 leads to the cathode of a diode 32, the anode of which is connected to the cursor 24.

When the pilot wants to make use of the radio-altimeter for executing a landing, he sets the switch 25—25' on the position corresponding to landing. The potential of the plate 14 of the oscilloscope is then either a function of the potential of the cursors 27 and 28 when the diode is not conductive, or a function of the potential of the cursors 31 and 28 when the diode is conductive, that is to say when the cursor 24 is at a potential having a tendency to exceed that of cursor 31. Therefrom it results that beyond a predetermined difference in altitude, the tension applied to plate 14 is a constant as in the preceding device. In order to make the working of the system better understood, the operations of the pilot during the landing are thereinafter set forth in relation to the indications of the control oscilloscope.

When the pilot is warned to set his machine in descent position for landing, he manipulates the switch 25—25' over to the position corresponding to the radio-altimeter. As the altitude remains rather high, the potential of cursor 24 has a tendency to be superior to that of cursor 31, so that as the diode 32 becomes conductive, the end of resistor 26 in connection with the plate of the diode 32 is actually at a potential very near that of cursor 31. The potential of the plate 14 is then defined by the positions of the cursors 28 and 31 and the resistors 26 and 27. These various elements are adjusted in such a manner that the displacement of the trace 2 on the screen of the oscilloscope causes the swinging of the aircraft in descent position by the pilot who endeavours to bring back this trace to the centre. Consequently the aircraft loses height. So long as the potential of cursor 24 is superior to that of cursor 31, the angle of the descent remains constant. There comes a time when the tension of cursor 24 becomes less than that of cursor 31 due to the loss of altitude. The diode 32 then ceases to be conductive. This time is called "beginning of the rounded curve." After that the potential of cursor 24 keeps on falling down and carries along with it the potential of plate 14 of the oscilloscope. The trace 2 shows then a propensity to rise again and the pilot, obeying the indication of this move, begins to lift the nose of the airplane. As the altitude keeps diminishing, the potential becomes lower and lower and the pilot rears by so much more the airplane. Cursor 28 has been so adjusted in position that the airplane is actually with its nose lifted up at the right angle for landing when the tension of cursor 24 corresponds to zero difference in altitude with the landing track. It results then that the airplane follows a trajectory tangent to ground and under a correct landing angle. Therefore the contact with the earth has been correctly effected. The altitude of the beginning of the rounded curve, the angle of the lifting for the landing and the radius of curvature of the rounded part are fixed by the adjustments of cursors 31, 28 and 24 on their respective potentiometers. In the course of the whole landing manoeuvre, the pilot had but to keep the trace 2 horizontal in the middle of the screen, that is to say to perform the same operations as in a horizontal straight flight. During this manoeuvre, the bar has continued to indicate the departures in lateral and longitudinal inclination of the airplane about its average trajectory, and the pilot could go on correcting these departures, consequently controlling an average and stable position of the airplane.

If an index mechanically connected to the rudder moves before the dial of the oscilloscope with a suitable step-down link, the pilot will have but to maintain coincidence of the index and the trace to ensure a correct pilotage.

The invention is not limited to moving conveyances; it is further susceptible of being applied to any mechanical device in which a moving element either in rotation or in translation is to be maintained on a predetermined direction, by means of an actuating member that controls its speed which is either linear or angular.

The devices which are the objects of the above description are given but by way of example in order to set forth the characteristic features of the invention.

In particular, any instrument sensitive to altitude may be substituted to the box-type altimeter for delivering the direct voltage applied to the plates of the oscilloscope. Moreover, the device described which is sensitive to pressure may be used in the driving or managing of any other mechanical device, the working of which has to be ensured at constant pressure, for example in a submarine navigating at a constant level in submersion.

In my copending applications Nos. 774,977, now Patent No. 2,536,683 granted January 2, 1951 and 774,978, now abandoned, units are described, which permit of correcting the indications given by the oscilloscope, respectively in relation to the derivative of the differences disclosed by the oscilloscope and in relation to the bearing of the moving machine with respect to a radio-beacon.

The present invention provides for the combination with the same oscilloscope of the unit which is the object of the present application and of one or of the two units described in the above-mentioned applications.

Having now particularly described and ascertained the nature of my said invention and in what manner the same is to be performed, I declare that what I claim is:

1. In combination with a height piloting indicator of a moving conveyance, which indicator comprises a cathode-ray oscillograph tube indicating the longitudinal inclination variations of said conveyance, a system comprising means sensitive to the altitude of the conveyance for modifying the indications given by said indicator in such a direction that the said indicator indicates to the pilot of the conveyance the operations to be executed in order to give its conveyance to a predetermined altitude.

2. In combination with a height piloting indicator of a moving conveyance, which indicator comprises a cathode-ray oscillograph tube indicating the longitudinal inclination variations of said conveyance, a system comprising a device sensitive to the altitude of the conveyance, means controlled by the said device for generating a direct voltage of a value varying with the difference between the altitude of the conveyance and a predetermined altitude up to a pre-determined value of this difference, and of a constant value when the difference between the altitude of the conveyance and the predetermined altitude exceeds the predetermined value, and means for introducing this voltage into the circuit of the deflecting plates of the cathode-ray oscillograph tube of said indicator, in such a direction that the said indicator indicates to the pilot of the conveyance the operations to be executed in order to give its conveyance the predetermined altitude.

3. In combination with a height piloting indicator of a moving conveyance, which indicator comprises a cathode-ray oscillograph tube indicating the longitudinal inclination variations of said conveyance, a system comprising an electric device sensitive to altitude, means for introducing in the circuit of the deflecting plates of the cathode-ray oscillograph tube of the said indicator a voltage which is proportional to the output current of the said device and means for limiting to a predetermined value the voltage introduced into the circuit of the deflecting plates of the cathode-ray oscillograph tube of said indicator.

4. In combination with a height piloting indicator of a moving conveyance, which indicator comprises a cathode-ray oscillograph tube indicating the longitudinal inclination variations of said conveyance, a system comprising a device sensitive to altitude, a member having an electric resistance which is variable, limited, adjustable as a function of the predetermined altitude which is intended for the conveyance to settle to, and having the contact element thereof controlled by the said device sensitive to altitude, a source of direct current supplying said member, and means for connecting the contact element of said member to a deflecting plate of the cathode-ray oscillograph tube of said indicator.

5. In combination with a height piloting indicator of a moving conveyance, which indicator comprises a cathode-ray oscillograph tube indicating the longitudinal inclination variations of said conveyance, a system comprising a device sensitive to altitude, a potentiometer the cursor of which is controlled by the said device and the resistant part of which can be displaced at will according to the predetermined altitude which is intended for the conveyance to settle to, the resistant part of said potentiometer occupying a part of the course of the cursor of said potentiometer and having its mid-point grounded, a source of direct current supplying said potentiometer, a graduation in altitude, an index integral with the resistant part of said potentiometer and moving before said graduation, and means for connecting the cursor of said potentiometer to a deflecting plate of the cathode-ray oscillograph tube of said indicator.

6. A combination as in claim 5 wherein the device sensitive to altitude comprises an altimetric indicating device comprising a pneumometric barometer of the aneroid type.

7. A combination as in claim 5 wherein the extremities of the moving resistant part of the potentiometer are displaced on two sliding contacts.

8. In combination with a height piloting indicator of a moving conveyance, which indicator comprises a cathode-ray oscillograph tube indicating the longitudinal inclination variations of said conveyance, a system comprising an altimetric box, an adjusting screw, a graduation in altitude determining the position of the said adjustment screw as a function of the predetermined altitude which is intended for the conveyance to settle to, a spring having one end thereof connected to the said adjustment screw and the other end thereof connected to the moving face of said box, a potentiometer, the cursor of which is controlled by said box and the mid-point of the resistant part of which is grounded, a source of direct current supplying the said potentiometer and means for connecting the cursor of said potentiometer to a deflecting plate of the cathode-ray oscillograph tube of said indicator.

9. In combination with a height piloting indicator of a moving conveyance, which indicator comprises a cathode-ray oscillograph tube indicating the longitudinal inclination variations of said conveyance, a system comprising a radio altimeter, a first potentiometer the resistant part of which is inserted in the output circuit of the said radio altimeter, a first resistor, one extremity of which is connected to a deflecting plate of the cathode-ray oscillograph tube of said indicator and the other extremity of which is connected to the cursor of the said first potentiometer, a second potentiometer having its mid-point grounded, provided with two cursors, a source supplying in direct current the resistant part of the said second potentiometer, a second resistor having one extremity thereof connected to the deflecting plate of the cathode-ray oscillograph tube of said indicator to which is connected the said first resistor, and the other extremity thereof connected to one of the cursors of the said second potentiometer, and a diode having the anode thereof connected to the cursor of the first potentiometer and the cathode thereof connected to the other cursors of the said second potentiometer.

10. In combination with a height piloting indicator of a moving conveyance, which indicator comprising a cathode-ray oscillograph tube indicating the longitudinal inclination variations of said conveyance, a first system comprising a device sensitive to altitude, a potentiometer the cursor of which is controlled by the said device and the resistant part of which can be displaced at will according to the predetermined altitude which is intended for the conveyance to settle to, the resistant part of said potentiometer occupying a part of the course of the cursor of said potentiometer and having its mid-point grounded, a source of direct current supplying said potentiometer, a graduation in altitude, an index integral with the resistant part of said potentiometer and moving before said graduation, and means for connecting the cursor of said potentiometer to a deflecting plate of the cathode-ray oscillograph tube of said indicator, a second system comprising a radio altimeter, a first potentiometer the resistant part of which is inserted in the output circuit of the said radio altimeter, a first resistor, one extremity of which is connected to the deflecting plate of the cathode-ray oscillograph tube of said indicator to which is connected the cursor of the potentiometer of the said first system and the other extremity of which is connected to the cursor of the said first potentiometer, a second potentiometer having its mid-point grounded, provided with two cursors, a source supplying in direct current the resistant part of the said second potentiometer, a second resistor having one extremity thereof connected to the deflecting plate of the cathode-ray oscillograph tube of said indicator to which is connected the said first resistor, and the other extremity thereof connected to one of the cursors of the said second potentiometer, and a diode having the anode thereof connected to the cursor of the first potentiometer and the cathode thereof connected to the other cursor of the said second potentiometer, and means inserted in the leads to the deflecting plate of the cathode-ray oscillograph tube of said indicator to which are connected said first and said second resistors so as to connect this plate at will to one of the two systems.

ANDRÉ GERMAIX.

REFERENCES CITED

The following references are of record in the file of this patent:

UNITED STATES PATENTS

| Number | Name | Date |
|---|---|---|
| 2,042,490 | Zahl | June 2, 1936 |
| 2,090,359 | Robinson | Aug. 17, 1937 |
| 2,403,603 | Korn | July 9, 1946 |